(12) United States Patent
Han et al.

(10) Patent No.: US 11,927,849 B2
(45) Date of Patent: Mar. 12, 2024

(54) BACKLIGHT INCLUDING RECTANGULAR REFLECTORS INCLUDING ROUNDED CORNERS AND METHOD FOR FABRICATING THE BACKLIGHT

(71) Applicant: Corning Incorporated, Corning, NY (US)

(72) Inventors: Songfeng Han, Shanghai (CN); Dmitri Vladislavovich Kuksenkov, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 105 days.

(21) Appl. No.: 17/639,411

(22) PCT Filed: Aug. 17, 2020

(86) PCT No.: PCT/US2020/046588
§ 371 (c)(1),
(2) Date: Mar. 1, 2022

(87) PCT Pub. No.: WO2021/045894
PCT Pub. Date: Mar. 11, 2021

(65) Prior Publication Data
US 2022/0334433 A1  Oct. 20, 2022

Related U.S. Application Data

(60) Provisional application No. 62/896,266, filed on Sep. 5, 2019.

(51) Int. Cl.
G02F 1/13357 (2006.01)
F21V 8/00 (2006.01)
G02F 1/1335 (2006.01)

(52) U.S. Cl.
CPC ..... *G02F 1/133605* (2013.01); *G02B 6/0055* (2013.01); *G02B 6/0068* (2013.01); *G02F 1/133603* (2013.01); *G02F 1/133613* (2021.01)

(58) Field of Classification Search
CPC .. G02B 6/0036; G02B 6/0031; G02B 6/0065; G02B 6/0055; G02B 6/0068;
(Continued)

(56) References Cited

U.S. PATENT DOCUMENTS

2004/0105247 A1* 6/2004 Calvin ................ G02B 6/0036
362/555
2009/0161038 A1* 6/2009 Toyama ........... G02F 1/133603
257/E33.001

(Continued)

FOREIGN PATENT DOCUMENTS

KR  10-2006-0128551 A  12/2006
WO  2019/046340 A1  3/2019

OTHER PUBLICATIONS

International Search Report and Written Opinion of the International Searching Authority; PCT /US2020/046588; dated Nov. 25, 2020; pp. 09; Korean Patent Office.
(Continued)

*Primary Examiner* — Charles S Chang
(74) *Attorney, Agent, or Firm* — Matthew J. Mason

(57) ABSTRACT

A backlight includes a substrate, a plurality of light sources, a light guide plate, and a plurality of rectangular reflectors including rounded corners. The plurality of light sources are proximate the substrate. The light guide plate is proximate the plurality of light sources. The plurality of rectangular reflectors including rounded corners are in a plane parallel to the light guide plate and each reflector corresponds to a light source.

24 Claims, 6 Drawing Sheets

(58) Field of Classification Search
CPC ......... G02F 1/133605; G02F 1/133603; G02F 1/133613
USPC ................................................ 349/61–68
See application file for complete search history.

(56) References Cited

U.S. PATENT DOCUMENTS

| | | |
|---|---|---|
| 2012/0013811 A1 | 1/2012 | Shimizu |
| 2012/0147277 A1* | 6/2012 | Yamamoto ........... G02B 6/0021 348/790 |
| 2019/0146142 A1 | 5/2019 | Kakkar et al. |
| 2019/0146274 A1 | 5/2019 | Kuniyasu et al. |

OTHER PUBLICATIONS

Ramachandra Rao, et al., "Masking LED hot spots in a thin direct lit backlight unit using semitransparent and perforated masks", Optics Communication, vol. 315, 2014, pp. 258-264.

* cited by examiner

BACKLIGHT INCLUDING RECTANGULAR REFLECTORS INCLUDING ROUNDED CORNERS AND METHOD FOR FABRICATING THE BACKLIGHT

CROSS-REFERENCE TO RELATED APPLICATIONS

This application claims the benefit of priority under 35 U.S.C. § 371 of International Application No. PCT/US2020/046588, filed on Aug. 17, 2020, which claims the benefit of priority under 35 U.S.C. § 119 of U.S. Provisional Application No. 62/896,266, filed Sep. 5, 2019, the content of each of which are incorporated herein by reference in their entirety.

BACKGROUND

Field

The present disclosure relates generally to backlights for displays. More particularly, it relates to backlights including rectangular reflectors including rounded corners.

Technical Background

Liquid crystal displays (LCDs) are commonly used in various electronics, such as cell phones, laptops, electronic tablets, televisions, and computer monitors. LCDs are light valve-based displays in which the display panel includes an array of individually addressable light valves. LCDs may include a backlight for producing light that may then be wavelength converted, filtered, and/or polarized to produce an image from the LCD. Backlights may be edge-lit or direct-lit. Edge-lit backlights may include a light emitting diode (LED) array edge-coupled to a light guide plate that emits light from its surface. Direct-lit backlights may include a two-dimensional (2D) array of LEDs directly behind the LCD panel.

Direct-lit backlights may have the advantage of improved dynamic contrast as compared to edge-lit backlights. For example, a display with a direct-lit backlight may independently adjust the brightness of each LED to set the dynamic range of the brightness across the image. This is commonly known as local dimming. To achieve desired light uniformity and/or to avoid hot spots in direct-lit backlights, however, a diffuser plate or film may be positioned at a distance from the LEDs, thus making the overall display thickness greater than that of an edge-lit backlight. Lenses positioned over the LEDs have been used to improve the lateral spread of light in direct-lit backlights. The optical distance (OD) between the LEDs and the diffuser plate or film in such configurations (e.g., from at least 10 to typically about 20-30 millimeters), however, still results in an undesirably high overall display thickness and/or these configurations may produce undesirable optical losses as the backlight thickness is decreased. While edge-lit backlights may be thinner, the light from each LED may spread across a large region of the light guide plate such that turning off individual LEDs or groups of LEDs may have a minimal impact on the dynamic contrast ratio.

SUMMARY

Some embodiments of the present disclosure relate to a backlight. The backlight includes a substrate, a plurality of light sources, a light guide plate, and a plurality of rectangular reflectors including rounded corners. The plurality of light sources are proximate the substrate. The light guide plate is proximate the plurality of light sources. The plurality of rectangular reflectors including rounded corners are in a plane parallel to the light guide plate, and each reflector corresponds to a light source.

Yet other embodiments of the present disclosure relate to a backlight. The backlight includes a substrate, a plurality of rectangular light sources, a reflective layer, a light guide plate, and a plurality of rectangular reflectors including rounded corners. The plurality of rectangular light sources are proximate the substrate. The reflective layer is on the substrate. The light guide plate is proximate the plurality of light sources and includes a pattern of light extractors. The plurality of rectangular reflectors including rounded corners are in a plane parallel to the light guide plate, and each reflector corresponds to a light source.

Yet other embodiments of the present disclosure relate to a backlight. The backlight includes a substrate, a plurality of light sources, a reflective layer, a light guide plate, and a plurality of reflectors. The plurality of light sources are proximate the substrate. The reflective layer is on the substrate. The light guide plate is proximate the plurality of light sources and includes a pattern of light extractors. The plurality of reflectors are proximate the light guide plate and the shape of each reflector corresponds to the shape of a corresponding light source.

Yet other embodiments of the present disclosure relate to a method for fabricating a backlight. The method includes arranging a plurality of light sources on a substrate. The method further includes applying a reflective layer on the substrate. The method further includes applying a pattern of light extractors to a light guide plate. The method further includes applying a plurality of rectangular reflectors comprising rounded corners in a plane parallel to the light guide plate on the light guide plate. The method further includes arranging the light guide plate over the plurality of light sources such that each reflector corresponds to a light source.

The backlights disclosed herein are thin direct-lit backlights with improved light efficiency. The backlights have an improved ability to hide light sources resulting in a thinner backlight while having an improved tolerance to alignment errors. The improved ability to hide the light sources allows for the removal of so-called "hot" spots directly above the light sources of the backlight, thus resulting in a uniform brightness across the display.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
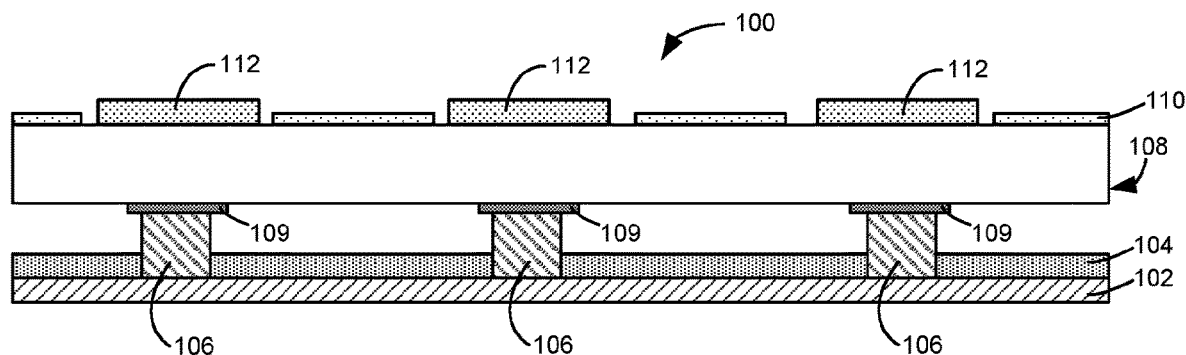
FIGS. 1A-1D are various views of an exemplary backlight including rectangular reflectors including rounded corners.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, vertical, horizontal—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

Referring now to FIGS. 1A-1D, various views of an exemplary backlight 100 are depicted. FIG. 1A is a cross-sectional view of backlight 100. Backlight 100 may include a substrate 102, a reflective layer 104, a plurality of light sources 106, a light guide plate 108, a pattern of light extractors 110, and a plurality of rectangular reflectors including rounded corners 112. The plurality of light sources 106 are arranged on substrate 102 and are in electrical communication with the substrate 102. The reflective layer 104 is on the substrate 102 and surrounds each light source 106. The light guide plate 108 is over the plurality of light sources 106 and optically coupled to each light source 106. In certain exemplary embodiments, an optical adhesive 109 may be used to couple the plurality of light sources 106 to the light guide plate 108. The optical adhesive (e.g., phenyl silicone) may have a refractive index greater than or equal to a refractive index of the light guide plate 108. The pattern of light extractors 110 is arranged on the upper surface of the light guide plate 108. The plurality of rectangular reflectors including rounded corners 112 are arranged in a plane parallel to the light guide plate 108, (e.g., on the upper surface of the light guide plate 108). Each rectangular reflector including rounded corners 112 corresponds to a light source 106. Each rectangular reflector including rounded corners 112 may be aligned with the corresponding light source 106, or misaligned to the corresponding light source by up to about 0.5 millimeters or another suitable distance in a direction parallel to the light guide plate 108 (e.g., in a horizontal or diagonal direction). The tolerance to misalignment is due to the shape of the rectangular reflectors including rounded corners 112.

The design of reflectors 112 is directly related to the backlight performance. Conventional backlights may use reflectors having a purely circular shape due to radial symmetry. Light sources, however, such as light emitting diode (LED) sources, may include a single or multiple semiconductor chips that are often rectangular or square-shaped, thus a purely circular reflector may not be the optimal design choice. The effect of difference in symmetry between a rectangular light source and a purely circular reflector is clearly observed when there is any misalignment between the light source and the reflector, which commonly results from various inaccuracies in manufacturing processes. When a purely circular reflector is misaligned with a square light source in different directions, the illuminance output from the light guide plate above the reflector varies. For example, there may be a first misalignment along a horizontal direction parallel to one of the light source sides and/or a second misalignment along a diagonal direction (e.g., 45 degrees) to one of the light source sides.

A purely circular reflector blocks light coming directly from the light source, which results in low illuminance in the center of the reflector. When there is misalignment in the horizontal direction between a rectangular light source and a purely circular reflector, there may be two peaks in the illuminance surrounding the reflector. Because two corners of the light source are closer to the edge of the reflector, more light from the corners may leak out, thus forming the two peaks. If there is misalignment in the diagonal direction between a rectangular light source and a purely circular reflector, there may be one peak, which is caused by one corner of the light source being closer to the edge of the reflector. In addition, the peak illuminance for a purely circular reflector for the case of diagonal misalignment is greater than for horizontal misalignment. Therefore, there is an anisotropic response to misalignment in different directions for a purely circular reflector. The rectangular-shaped reflectors including rounded corners 112 disclosed herein, however, include a reflector shape such that the response is more isotropic, or less sensitive to the direction of a misalignment. Therefore, the rectangular-shaped reflectors including rounded corners 112 disclosed herein have an improved tolerance to misalignment compared to purely circular reflectors.

Figure 1B:
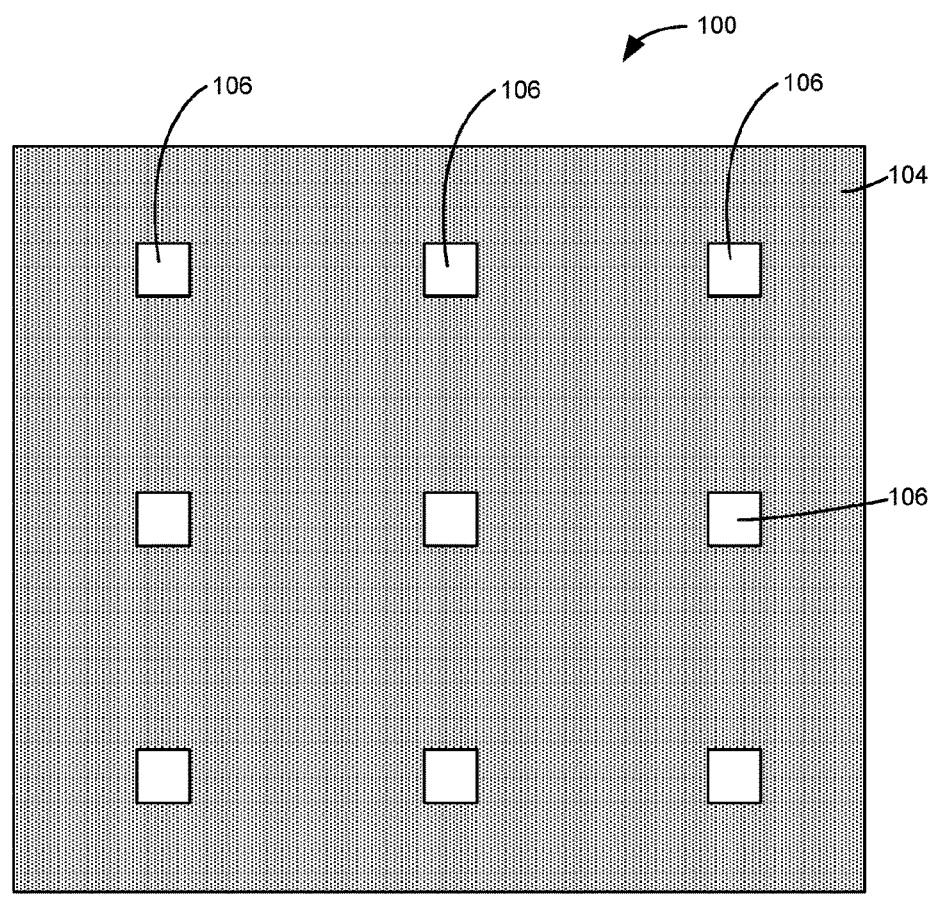

FIG. 1B is a top view of the plurality of light sources 106 and reflective layer 104 on substrate 102. Light sources 106 are arranged in a 2D array including a plurality of rows and a plurality of columns. While nine light sources 106 are illustrated in FIG. 1B in three rows and three columns, in other embodiments backlight 100 may include any suitable number of light sources 106 arranged in any suitable number of rows and any suitable number of columns. Light sources 106 may also be arranged in other periodic patterns, for example, a hexagonal or triangular lattice, or as quasi-periodic or non-strictly periodic patterns. For example, the spacing between light sources 106 may be smaller at the edges and/or corners of the backlight.

Substrate 102 may be a printed circuit board (PCB), a glass or plastic substrate, or another suitable substrate for passing electrical signals to each light source 106 for individually controlling each light source. Substrate 102 may be a rigid substrate or a flexible substrate. The reflective layer 104 may include, for example, metallic foils, such as silver, platinum, gold, copper, and the like; dielectric materials (e.g., polymers such as polytetrafluoroethylene (PTFE)); porous polymer materials, such as polyethylene terephthalate (PET), Poly(methyl methacrylate) (PMMA), polyethylene naphthalate (PEN), polyethersulfone (PES), etc., multi-layer dielectric interference coatings, or reflective inks, including white inorganic particles such as titania, barium sulfate, etc., or other materials suitable for reflecting light.

Each of the plurality of light sources 106 may, for example, be an LED, a micro-LED, an organic LED (OLED), or another suitable light source having a wavelength ranging from about 100 nanometers to about 750 nanometers. The light from each light source 106 is optically coupled to the light guide plate 108. As used herein, the term "optically coupled" is intended to denote that a light source is positioned at a surface of the light guide plate 108 and is in an optical contact with the light guide plate 108 directly or through an optically clear adhesive 109, so as to introduce light into the light guide plate that at least partially propagates due to total internal reflection. The light from each light source 106 is optically coupled to the light guide plate 108 such that a first portion of the light travels laterally in the light guide plate 108 due to the total internal reflection and is extracted out of the light guide plate by the pattern of light extractors 110, and a second portion of the light travels laterally between the reflective layer 104 and the rectangular reflectors including rounded corners 112 due to multiple reflections at the reflective surfaces of the reflective layer 104 and the rectangular reflectors including rounded corners 112 or between an optical film stack (shown in FIG. 4) and the reflective layer 104.

According to various embodiments, the light guide plate 108 may include any suitable transparent material used for lighting and display applications. As used herein, the term "transparent" is intended to denote that the light guide plate has an optical transmission of greater than about 70 percent over a length of 500 millimeters in the visible region of the spectrum (about 420-750 nanometers). In certain embodiments, an exemplary transparent material may have an optical transmittance of greater than about 50 percent in the ultraviolet (UV) region (about 100-400 nanometers) over a length of 500 millimeters. According to various embodiments, the light guide plate may include an optical transmittance of at least 95 percent over a path length of 50 millimeters for wavelengths ranging from about 450 nanometers to about 650 nanometers.

The optical properties of the light guide plate may be affected by the refractive index of the transparent material. According to various embodiments, the light guide plate 108 may have a refractive index ranging from about 1.3 to about 1.8. In other embodiments, the light guide plate 108 may have a relatively low level of light attenuation (e.g., due to absorption and/or scattering). The light attenuation (a) of the light guide plate 108 may, for example, be less than about 5 decibels per meter for wavelengths ranging from about 420-750 nanometers. The light guide plate 108 may include polymeric materials, such as plastics (e.g., polymethyl methacrylate (PMMA), methylmethacrylate styrene (MS), polydimethylsiloxane (PDMS)), polycarbonate (PC), or other similar materials. The light guide plate 108 may also include a glass material, such as aluminosilicate, alkali-aluminosilicate, borosilicate, alkali-borosilicate, alumino-borosilicate, alkali-aluminoborosilicate, soda lime, or other suitable glasses. Non-limiting examples of commercially available glasses suitable for use as a glass light guide plate 108 include EAGLE XG®, Lotus, Willow®, Iris™, and Gorilla® glasses from Corning Incorporated.

Figure 1C:
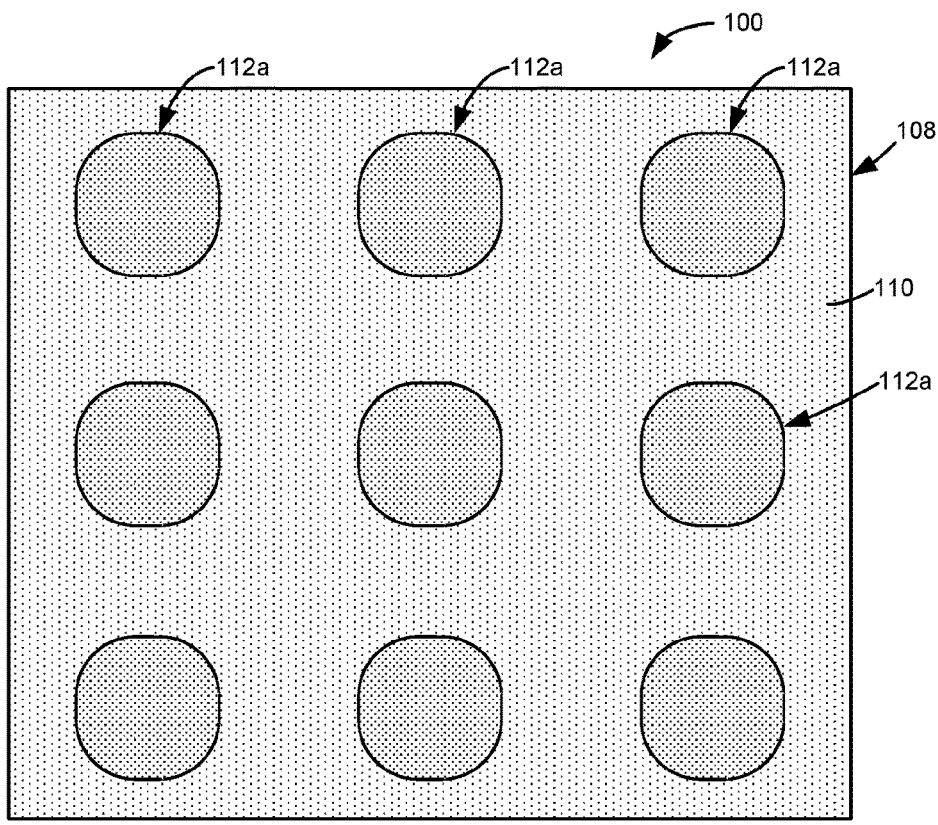
Figure 1D:
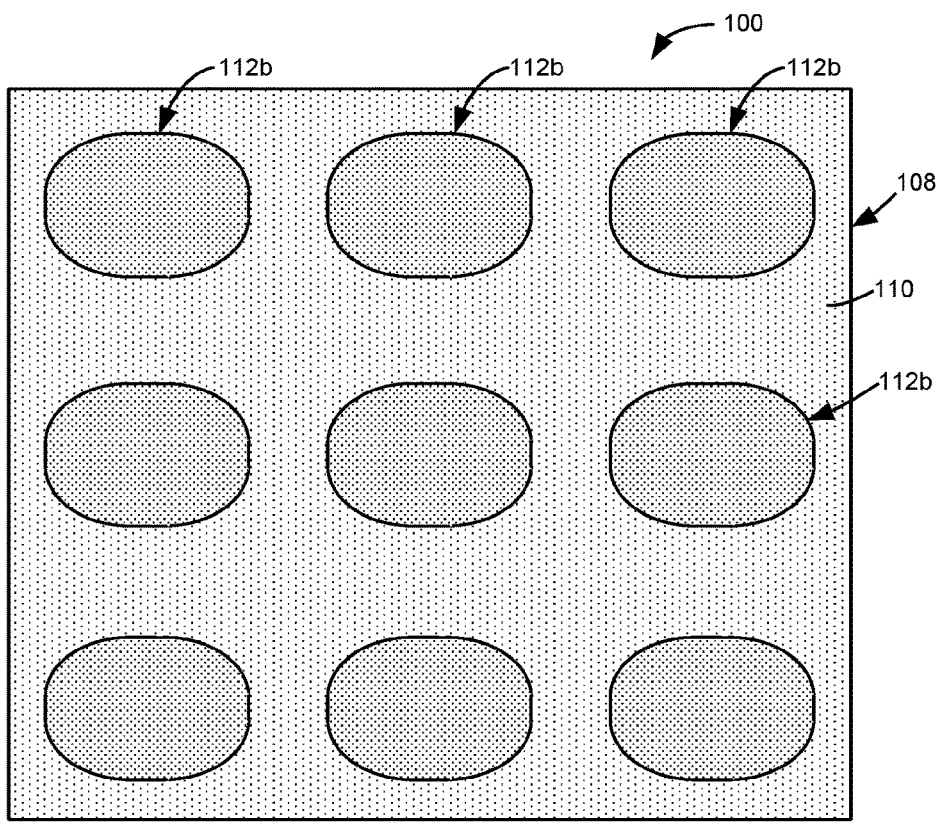

FIGS. 1C and 1D are top views of the pattern of light extractors 110 surrounding each reflector 112 on the light guide plate 108. In FIG. 1C, each reflector includes a square reflector including rounded corners 112a, while in FIG. 1D each reflector includes a rectangular reflector including rounded corners 112b. Each square reflector including rounded corners 112a (which is a specific embodiment of a rectangular reflector including rounded corners) may correspond to a square-shaped light source 106, while each rectangular reflector including rounded corners 112b may correspond to a rectangular-shaped light source 106 having the same orientation as the reflector 112b. While in FIGS. 1C and 1D, the pattern of light extractors 110 extends to the edges of each reflector 112, in other embodiments the pattern of light extractors 110 may be spaced apart from the edges of each reflector 112 as illustrated in FIG. 1A.

The light guide plate 108 includes the pattern of light extractors 110 on the upper surface of the light guide plate. In certain exemplary embodiments, light guide plate 108 may include a pattern of light extractors on the lower surface of the light guide plate in place of or in addition to the pattern of light extractors 110 on the upper surface of the light guide plate. As used herein, the term "pattern" is intended to denote that the light extractors are present on or under the surface of the light guide plate in any given pattern or design, which may, for example, be random or arranged, repetitive or non-repetitive, uniform or non-uniform. In other embodiments, the light extractors may be located within the matrix of the light guide plate adjacent to the surface (e.g., below the surface). For example, the light extractors may be distributed across the surface (e.g., as textural features making up a roughened or raised surface) or may be distributed within and throughout the light guide plate or portions thereof (e.g., as laser-damaged sites or features).

Suitable methods for creating such light extractors may include printing, such as inkjet printing, screen printing, microprinting, and the like, embossing or micro-replication, such as UV or thermal embossing in a light guide plate material itself or an additional material coated on the surface of the light guide plate, texturing, mechanical roughening, etching, injection molding, coating, laser damaging, or any combination thereof. Non-limiting examples of such methods include, for instance, acid etching a surface, coating a surface with $TiO_2$, particle filled ink or paint, coating a surface with a transparent ink containing micro polymer or glass beads of varying sizes, and laser damaging the substrate by focusing a laser on a surface or within the substrate matrix.

The reflectors 112 (including 112a and 112b) may be fabricated directly on the upper surface of the light guide plate 108. The reflectors 112 increase the ability of hiding the light sources 106. Fabricating reflectors 112 directly on the upper surface of the light guide plate 108 also saves space. In certain exemplary embodiments, each reflector 112 is a diffuse reflector, such that each reflector 112 further enhances the performance of the backlight 100 by scattering some light rays at high enough angles such that they can propagate in the light guide plate 108 by total internal reflection. Such rays will then not experience multiple bounces between the reflectors 112 and the reflective layer 104 or between an optical film stack and the reflective layer 104 and therefore avoid loss of optical power, thereby increasing the backlight efficiency. In certain exemplary embodiments, each reflector 112 is a specular reflector. In other embodiments, some areas of each reflector 112 have a more diffuse character of reflectivity and some areas have a more specular character of reflectivity.

In certain exemplary embodiments, each reflector 112 includes a single layer having a constant thickness. Each reflector 112 may be formed, for example, by printing (e.g., inkjet printing, screen printing, microprinting, etc.) a pattern with white ink, black ink, metallic ink, or other suitable ink. Each reflector 112 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal. Each reflector 112 may have a varying optical density. The varying optical density may be achieved, for example, by printing a variable proportion of clear and reflective ink on light guide plate 108 or by printing an ink of variable thickness. The varying optical density may also be achieved by making the reflector 112 discontinuous, meaning that the reflective material is present in some places and not present in some other places, according to a predetermined pattern. In certain exemplary embodiments, the reflector 112 could be a continuous layer with small gaps where the reflective material is not present. In other embodiments, the reflector 112 may consist of relatively small isolated patches of reflective material separated by relatively large empty space. The proportion of covered and empty space within the reflector may vary between 0 and 100 percent.

In certain exemplary embodiments, each reflector 112 includes a plurality of layers. Each layer may have a constant thickness, however, the constant thickness may be different for each layer. In other embodiments, each layer may have a variable thickness. Each layer may have a varying optical density. Each layer may vary from the other layers in reflection, absorption, and/or transmission. Each layer may be absorptive, for example, by containing black material. Each layer may be reflective, for example, by containing white or metallic material. Each layer may also be both absorptive and reflective by containing more than one type of material, such as inks with added metal particles (e.g., silver, aluminum, etc.). In this case, the absorptive and/or reflective properties may vary over the reflector area.

In certain exemplary embodiments where white light sources 106 are used, the presence of different reflective and absorptive materials in variable density in the reflectors 112 may be beneficial for minimizing the color shift across each of the dimming zones of the backlight. Multiple bounces of light rays between the reflectors 112 and the reflective layer 104 (FIG. 1A) may cause more loss of light in the red part of the spectrum than in the blue, or vice versa. In this case, engineering the reflection to be color neutral, for example by using slightly colored reflective/absorptive materials, or materials with the opposite sign of dispersion (in this case, dispersion means spectral dependence of the reflection and/or absorption) may minimize the color shift.

Figure 2A:
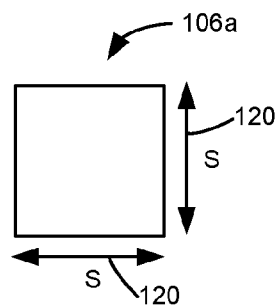
FIGS. 2A-2C illustrate details of the exemplary backlight of FIG. 1A including a square reflector including rounded corners.
Figure 2B:
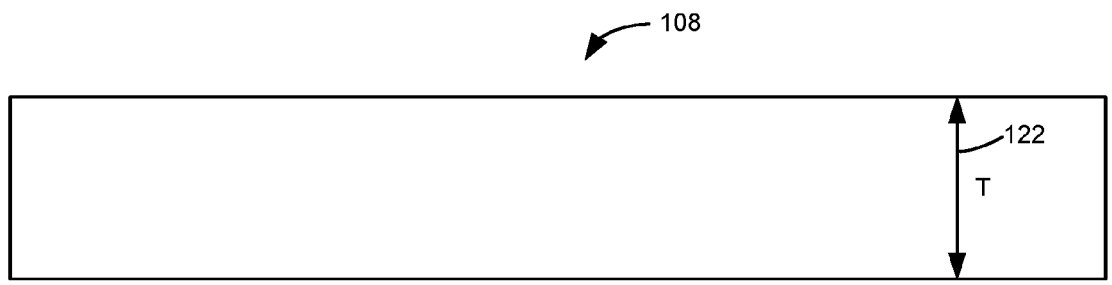
Figure 2C:
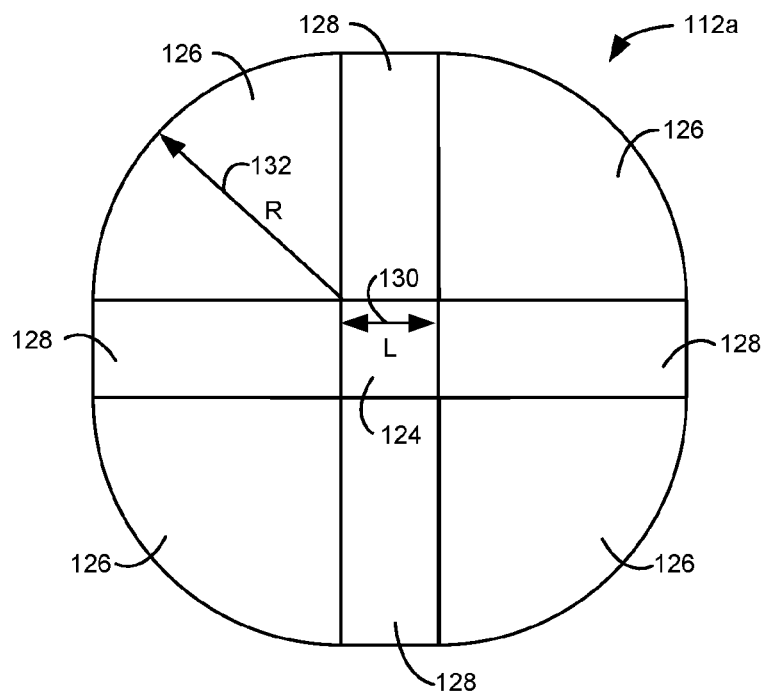

FIGS. 2A-2C illustrate details of the exemplary backlight 100 of FIG. 1A including a square reflector including rounded corners. FIG. 2A is a top view of an exemplary light source 106a that may be used for light source 106 of backlight 100. In this embodiment, light source 106a is square-shaped such that each side of the light source includes a length S as indicated at 120. FIG. 2B is a cross-sectional view of the light guide plate 108 of backlight 100. Light guide plate 108 includes a thickness T as indicated at 122.

FIG. 2C is a top view of an exemplary square reflector including rounded corners 112a. The lines within the outline of square reflector including rounded corners 112a are provided for describing the dimensions of various portions of square reflector including rounded corners 112a and are not part of the reflector. It is noted that the various portions of square reflector including rounded corners 112a described below are merely used to describe the shape of the overall reflector and are not separate components of the reflector.

Square reflector including rounded corners 112a includes a central square-shaped portion 124, a rounded corner portion 126 extending from each corner of the central square-shaped portion 124, and a rectangular-shaped portion 128 between rounded corner portions 126 and extending from each side of the central square-shaped portion 124. The central square-shaped portion 124 includes a length L as indicated at 130, and each rounded corner portion 126 includes a radius R as indicated at 132. Each rectangular-shaped portion 128 includes a length L along each edge of the central square-shaped portion 124 and a width along each edge of rounded corner portions 126 equal to the radius R. The radius R of each rounded corner portion 126 may be greater than or equal to the length L of the central square-shaped portion 124. In certain exemplary embodiments, the radius R of each rounded corner portion 126 may be greater than or equal to two times the length L of the central square-shaped portion 124.

The length L and the radius R may be a function of the length S of the light source 106a and the thickness T of the light guide plate 108 as follows:

$$L = a*S + b*T, \text{ and}$$

$$R = c*S + d*T$$

where: a ranges from about 0.1 to about 0.2,
  b ranges from about 0.28 to about 0.4,
  c ranges from about 0.26 to about 0.54, and
  d ranges from about 0.73 to about 1.06.

In certain exemplary embodiments, "a" equals about 0.158, "b" equals about 0.347, "c" equals about 0.405, and "d" equals about 0.895. For example, for a square light source 106a including a length S equal to about 1.6 millimeters and a light guide plate 108 including a thickness T equal to about 1.10 millimeters, the length L of the central square-shaped portion 124 would equal about 0.63 millimeters and the radius R of each rounded corner portion 126 would equal about 1.63 millimeters. By using square reflectors including rounded corners 112a corresponding to square light sources 106a, each reflector 112a may be misaligned to the corresponding light source 106a up to a certain amount (e.g., up to about 0.5 millimeters) in a direction parallel to the light guide plate (e.g., in either a horizontal or diagonal direction).

Figure 3A:
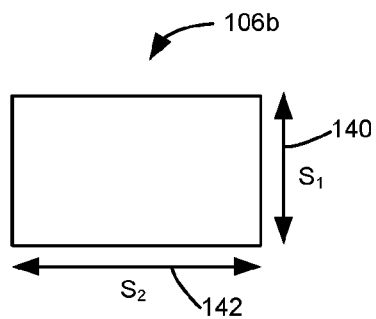
FIGS. 3A-3C illustrate details of the exemplary backlight of FIG. 1A including a rectangular reflector including rounded corners.
Figure 3B:
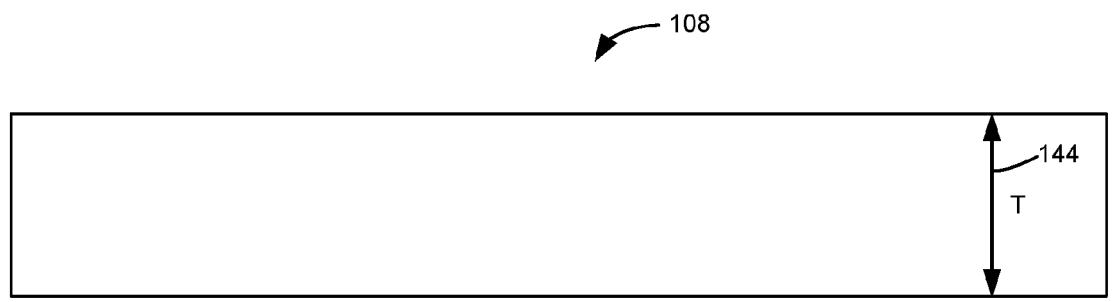
Figure 3C:
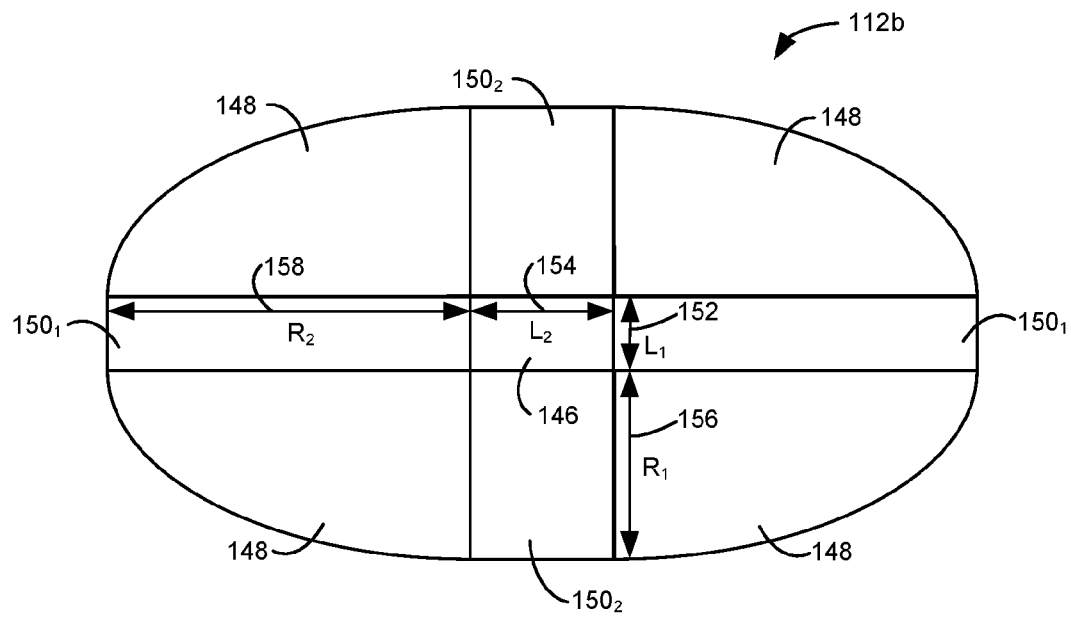

FIGS. 3A-3C illustrate details of the exemplary backlight 100 of FIG. 1A including a rectangular reflector including rounded corners. FIG. 3A is a top view of an exemplary light source 106b that may be used for light source 106 of backlight 100. In this embodiment, light source 106b is rectangular such that two opposing sides of the light source include a length $S_1$ as indicated at 140, and the other two opposing sides of the light source include a width $S_2$ as indicated at 142. FIG. 3B is a cross-sectional view of the light guide plate 108 of backlight 100. Light guide plate 108 has a thickness T as indicated at 144.

FIG. 3C is a top view of an exemplary rectangular reflector including rounded corners 112b. The lines within the outline of rectangular reflector including rounded corners 112b are provided for describing the dimensions of various portions of rectangular reflector including rounded corners 112b and are not part of the reflector. It is noted that the various portions of rectangular reflector including rounded corners 112b described below are merely used to describe the shape of the overall reflector and are not separate components of the reflector.

Rectangular reflector including rounded corners 112b includes a central rectangular-shaped portion 146, a rounded corner portion 148 extending from each corner of the central rectangular-shaped portion 146, a rectangular-shaped portion $150_1$ between rounded corner portions 148 and extending from each short side (e.g., left and right sides) of the central rectangular-shaped portion 146, and a rectangular-shaped portion $150_2$ between rounded corner portions 148 and extending from each long side (e.g., upper and lower sides) of the central rectangular-shaped portion 146. The central rectangular-shaped portion 146 includes a length $L_1$ as indicated at 152 and a width $L_2$ as indicated at 154. Each rounded corner portion 148 includes a length radius $R_1$ as indicated at 156 and a width radius $R_2$ as indicated at 158. Each rectangular-shaped portion $150_1$ includes a length $L_1$ along a short edge of the central rectangular-shaped portion 146 and a width along each edge of rounded corner portions 148 equal to the width radius $R_2$. Each rectangular-shaped portion $150_2$ includes a width $L_2$ along a long edge of the central rectangular-shaped portion 146 and a length along each edge of rounded corner portions 148 equal to the length radius $R_1$. The length radius $R_1$ of each rounded corner portion 148 may be greater than or equal to the length $L_1$ of the central rectangular-shaped portion 146, and the width radius $R_2$ of each rounded corner portion 148 may be greater than or equal to the width $L_2$ of the central rectangular-shaped portion 146. In certain exemplary embodiments, the length radius $R_1$ of each rounded corner portion 148 may be greater than or equal to two times the length $L_1$ of the central rectangular-shaped portion 146, and the width radius $R_2$ of each rounded corner portion 148 may be greater than or equal to two times the width $L_2$ of the central rectangular-shaped portion 146.

The length $L_1$, the width $L_2$, the length radius $R_1$, and the width radius $R_2$ may be a function of the length $S_1$ and the width $S_2$ of the light source 106b and the thickness T of the light guide plate 108 as follows:

$$L_1 = a*S_1 + b*T,$$

$$R_1 = c*S_1 + d*T,$$

$$L_2 = a*S_2 + b*T, \text{ and}$$

$$R_2 = C*S_2 + d*T,$$

where: a ranges from about 0.1 to about 0.2,
b ranges from about 0.28 to about 0.4,
c ranges from about 0.26 to about 0.54, and
d ranges from about 0.73 to about 1.06.

In certain exemplary embodiments, "a" equals about 0.158, "b" equals about 0.347, "c" equals about 0.405, and "d" equals about 0.895. For example, for a rectangular light source 106b including a length $S_1$ equal to about 1 millimeter and a width $S_2$ equal to about 2 millimeters and a light guide plate 108 including a thickness T equal to about 1.10 millimeters, the length $L_1$ of central rectangular-shaped portion 146 would equal about 0.539 millimeters, the width $L_2$ of central rectangular-shaped portion 146 would equal about 0.697, the length radius $R_1$ of each rounded corner portion 148 would equal about 1.389 millimeters, and the width radius $R_2$ of each rounded corner portion 148 would equal about 1.794 millimeters. By using rectangular reflectors including rounded corners 112b corresponding to rectangular light sources 106b, each reflector 112b may be misaligned to the corresponding light source 106b up to a certain amount (e.g., up to about 0.5 millimeters) in a direction parallel to the light guide plate (e.g., in either a horizontal or diagonal direction).

Figure 4:
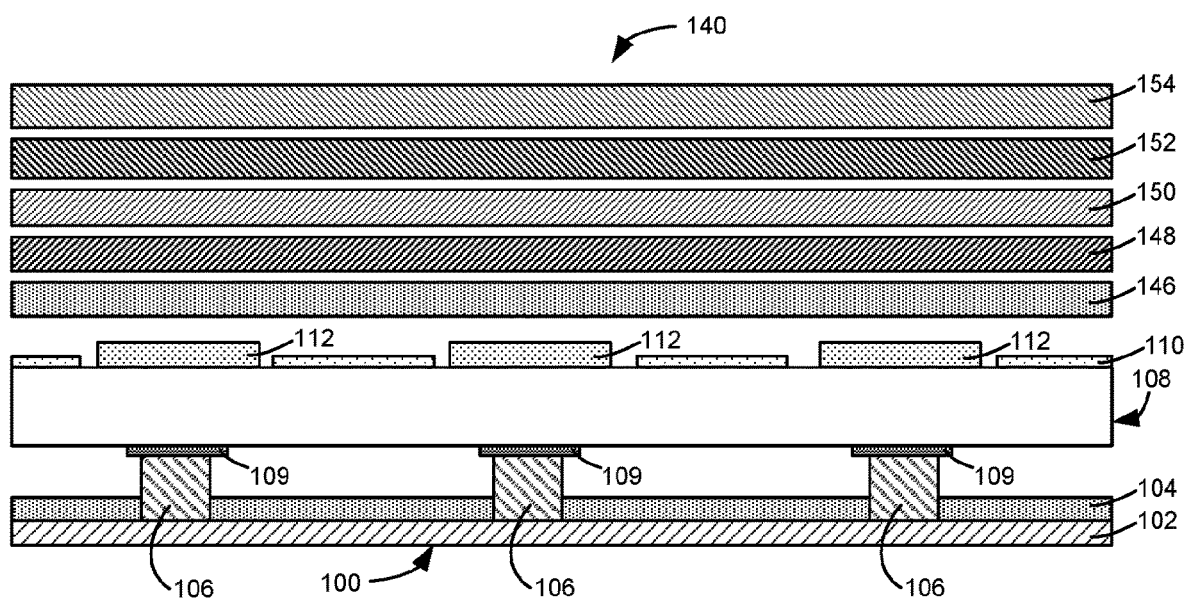
FIG. 4 is a cross-sectional view of an exemplary liquid crystal display (LCD) including rectangular reflectors including rounded corners.

FIG. 4 is a cross-sectional view of an exemplary liquid crystal display (LCD) 140. LCD 140 includes a backlight 100 including rectangular reflectors including rounded corners 112 as previously described and illustrated with reference to FIGS. 1A-3C. In addition, LCD 140 includes optionally a diffuser plate 146 over backlight 100, optionally a quantum dot film 148 over the diffuser plate 146, optionally a prismatic film 150 over the quantum dot film 148, optionally a reflective polarizer 152 over the prismatic film 150, and a display panel 154 over the reflective polarizer 152.

To maintain the alignment between the light sources 106 and the rectangular reflectors including rounded corners 112 on the light guide plate 108 for the proper functioning of the backlight 100, it is advantageous if the light guide plate 108 and the substrate 102 are made of the same or similar type of material so that both the rectangular reflectors including rounded corners 112 on the light guide plate 108 and the light sources 106 on the substrate 102 are registered well to each other over a large range of operating temperatures. In certain exemplary embodiments, the light guide plate 108 and the substrate 102 are made of the same plastic material. In other embodiments, the light guide plate 108 and the substrate 102 are made of the same type of glass.

An alternative solution to keep the light guide plate 108 and light sources 106 on the substrate 102 in alignment is to use a highly flexible substrate. The highly flexible substrate may be made of a polyimide or other high temperature resistant polymer film to allow component soldering. The highly flexible substrate may also be made of materials such as FR4 or fiberglass, but of a significantly lower thickness than usual. In certain exemplary embodiments, an FR4 material of 0.4 millimeters thickness may be used for substrate 102, which may be sufficiently flexible to absorb the dimensional changes resulting from changing operating temperatures.

Figure 5:
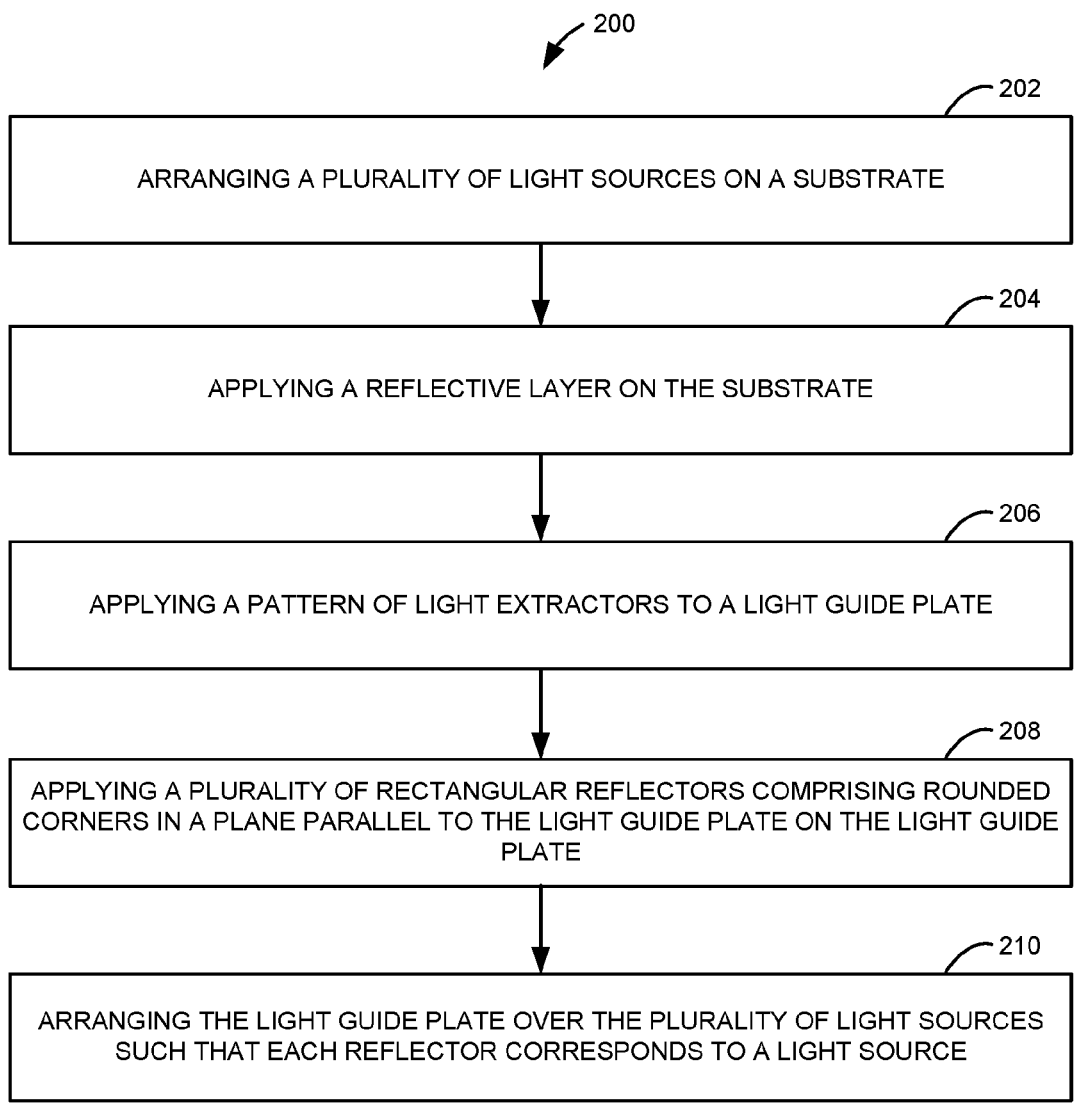
FIG. 5 is a flow diagram illustrating an exemplary method for fabricating a backlight.

FIG. 5 is a flow diagram illustrating an exemplary method 200 for fabricating a backlight. Method 200 may, for example, be used to fabricate backlight 100 previously described and illustrated with reference to FIGS. 1A-3C. As illustrated in FIG. 5, at 202 method 200 includes arranging a plurality of light sources on a substrate. For example, a plurality of light sources 106 may be arranged on a substrate 102 as illustrated in FIG. 1A. In certain exemplary embodiments, arranging the plurality of light sources on the substrate includes arranging a plurality of rectangular-shaped light emitting diodes on the substrate. Arranging the plurality of rectangular-shaped light emitting diodes on the substrate may include arranging a plurality of square-shaped light emitting diodes on the substrate.

At 204, method 200 includes applying a reflective layer on the substrate. For example, a reflective layer 104 may be applied to the substrate 102 as illustrated in FIG. 1A. At 206, method 200 includes applying a pattern of light extractors to a light guide plate. For example, a pattern of light extractors 110 may be applied to a light guide plate 108 as illustrated in FIG. 1A. At 208, method 200 includes applying a plurality of rectangular reflectors comprising rounded corners in a plane parallel to the light guide plate on the light guide plate. For example, a plurality of rectangular reflectors including rounded corners 112 may be applied to the light guide plate 108 as illustrated in FIG. 1A. In certain exemplary embodiments, applying the plurality of reflectors on the light guide plate includes applying a plurality of square reflectors including rounded corners on the light guide plate. Applying the plurality of reflectors on the light guide plate may include printing the plurality of reflectors on the light guide plate. In certain exemplary embodiments, each of the plurality of reflectors includes a central rectangular portion and a rounded corner portion extending from each corner of the central rectangular portion. The radius of each rounded corner portion may be greater than or equal to a length of the central rectangular portion. In certain exemplary embodiments, the radius of each rounded corner portion may be greater than or equal to two times a length of the central rectangular portion.

At 210, method 200 includes arranging the light guide plate over the plurality of light sources such that each reflector corresponds to a light source. For example, light guide plate 108 (with light extraction features 110 and reflectors 112) may be arranged over the plurality of light sources 106 such that each reflector 112 corresponds to a light source 106 as illustrated in FIG. 1A. In certain exemplary embodiments, arranging the light guide plate over the plurality of light sources includes arranging the light guide plate over the plurality of light sources such that each of the plurality of reflectors is misaligned to the corresponding light source by up to 0.5 millimeters in a direction parallel to the light guide plate (e.g., in a horizontal or diagonal direction).

It will be apparent to those skilled in the art that various modifications and variations can be made to embodiments of the present disclosure without departing from the spirit and scope of the disclosure. Thus it is intended that the present disclosure cover such modifications and variations provided they come within the scope of the appended claims and their equivalents.

What is claimed is:

1. A backlight comprising:
a substrate;
a plurality of light sources proximate the substrate;
a light guide plate proximate the plurality of light sources; and
a plurality of rectangular reflectors comprising rounded corners in a plane parallel to the light guide plate, each reflector corresponding to a light source.

2. The backlight of claim 1, wherein each of the plurality of reflectors comprises a square reflector comprising rounded corners.

3. The backlight of claim 1, wherein
each of the plurality of reflectors comprises a central rectangular portion and a rounded corner portion extending from each corner of the central rectangular portion, and
a length radius of each rounded corner portion is greater than or equal to a length of the central rectangular portion.

4. The backlight of claim 3, wherein the length radius of each rounded corner portion is greater than or equal to two times the length of the central rectangular portion.

5. The backlight of claim 1, wherein each of the plurality of light sources comprises a rectangular-shaped light emitting diode.

6. The backlight of claim 5, wherein each of the plurality of light sources comprises a square-shaped light emitting diode.

7. The backlight of claim 1, wherein each of the plurality of reflectors is misaligned to the corresponding light source by up to 0.5 millimeters in a direction parallel to the light guide plate.

8. A backlight comprising:
a substrate;
a plurality of rectangular light sources proximate the substrate;
a reflective layer on the substrate;
a light guide plate proximate the plurality of light sources, the light guide plate comprising a pattern of light extractors; and
a plurality of rectangular reflectors comprising rounded corners in a plane parallel to the light guide plate, each reflector corresponding to a light source.

9. The backlight of claim 8, wherein
each of the plurality of light sources comprises a square light source comprising a length (S);
the light guide plate comprises a thickness (T);
each of the plurality of reflectors comprises a square-shaped central portion comprising a length (L) and a rounded corner portion extending from each corner of the square-shaped portion and comprising a radius (R); and $$L = a*S + b*T, \text{ and}$$

$$R = c*S + d*T$$

where: a ranges from 0.1 to 0.2,
b ranges from 0.28 to 0.4,
c ranges from 0.26 to 0.54, and
d ranges from 0.73 to 1.06.

10. The backlight of claim 8, wherein
each of the plurality of light sources comprises a rectangular light source comprising a length ($S_1$) and a width ($S_2$);
the light guide plate comprises a thickness (T);
each of the plurality of reflectors comprises a rectangular-shaped central portion comprising a length ($L_1$) and a width ($L_2$) and a rounded corner portion extending from each corner of the rectangular-shaped portion and comprising a length radius ($R_1$) and a width radius ($R_2$); and $$L_1 = a*S_1 + b*T,$$

$$R_1 = c*S_1 + d*T,$$

$$L_2 = a*S_2 + b*T, \text{ and}$$

$$R_2 = C*S_2 + d*T,$$

where: a ranges from 0.1 to 0.2, b ranges from 0.28 to 0.4,
c ranges from 0.26 to 0.54, and
d ranges from 0.73 to 1.06.

11. The backlight of claim 8, further comprising:
an optical adhesive coupling the plurality of light sources to the light guide plate, the optical adhesive comprising a refractive index greater than or equal to a refractive index of the light guide plate.

12. The backlight of claim 8, wherein each of the plurality of reflectors comprises ink.

13. A backlight comprising:
a substrate;
a plurality of light sources proximate the substrate;
a reflective layer on the substrate;
a light guide plate proximate the plurality of light sources, the light guide plate comprising a pattern of light extractors; and
a plurality of reflectors proximate the light guide plate, the shape of each reflector corresponding to the shape of a corresponding light source.

14. The backlight of claim 13, wherein
each of the plurality of light sources comprises a rectangular light source; and
each of the plurality of reflectors comprises a rectangular reflector comprising rounded corners in a plane parallel to the light guide plate.

15. The backlight of claim 13, wherein
each of the plurality of light sources comprises a square light source; and
each of the plurality of reflectors comprises a square reflector comprising rounded corners in a plane parallel to the light guide plate.

16. The backlight of claim 13, wherein each of the plurality of reflectors is misaligned to the corresponding light source by up to 0.5 millimeters in a direction parallel to the light guide plate.

17. A method for fabricating a backlight, the method comprising:
arranging a plurality of light sources on a substrate;
applying a reflective layer on the substrate;
applying a pattern of light extractors to a light guide plate;
applying a plurality of rectangular reflectors comprising rounded corners in a plane parallel to the light guide plate on the light guide plate; and
arranging the light guide plate over the plurality of light sources such that each reflector corresponds to a light source.

18. The method of claim 17, wherein applying the plurality of reflectors on the light guide plate comprises applying a plurality of square reflectors comprising rounded corners on the light guide plate.

19. The method of claim 17, wherein
each of the plurality of reflectors comprises a central rectangular portion and a rounded corner portion extending from each corner of the central rectangular portion, and
a length radius of each rounded corner portion is greater than or equal to a length of the central rectangular portion.

20. The method of claim 19, wherein the length radius of each rounded corner portion is greater than or equal to two times the length of the central rectangular portion.

21. The method of claim 17, wherein applying the plurality of reflectors on the light guide plate comprises printing the plurality of reflectors on the light guide plate.

22. The method of claim 17, wherein arranging the plurality of light sources on the substrate comprises arranging a plurality of rectangular-shaped light emitting diodes on the substrate.

23. The method of claim 22, wherein arranging the plurality of rectangular-shaped light emitting diodes on the substrate comprises arranging a plurality of square-shaped light emitting diodes on the substrate.

24. The method of claim 17, wherein arranging the light guide plate over the plurality of light sources comprises arranging the light guide plate over the plurality of light sources such that each of the plurality of reflectors is misaligned to the corresponding light source by up to 0.5 millimeters in a direction parallel to the light guide plate.

* * * * *